(12) United States Patent
Landa et al.

(10) Patent No.: US 8,186,940 B2
(45) Date of Patent: May 29, 2012

(54) VENTILATION ARRANGEMENT

(75) Inventors: Bernard P. Landa, Taylore, SC (US); Lane Porter, Simpsonville, SC (US); Ulrich Uphues, Hannover (DE); Lawrence D. Willey, Simpsonville, SC (US); Ulrich Neumann, Simpsonville, SC (US); Negel E. Martin, Bakersfield, AZ (US)

(73) Assignee: General Electric Company, Schenectady, NY (US)

( * ) Notice: Subject to any disclaimer, the term of this patent is extended or adjusted under 35 U.S.C. 154(b) by 1228 days.

(21) Appl. No.: 11/850,104

(22) Filed: Sep. 5, 2007

(65) Prior Publication Data

US 2009/0060748 A1    Mar. 5, 2009

(51) Int. Cl.
*B64C 11/14* (2006.01)
*F01D 5/08* (2006.01)
(52) U.S. Cl. .................................... 415/116; 416/245 R
(58) Field of Classification Search .................. 415/115, 415/116; 416/93 R, 94, 97 R, 245 R; 290/44, 290/55
See application file for complete search history.

(56) References Cited

U.S. PATENT DOCUMENTS

| | | | | |
|---|---|---|---|---|
| 1,699,949 A * | 1/1929 | Bucklen | ........................... | 290/55 |
| 4,527,072 A * | 7/1985 | van Degeer | ..................... | 290/55 |
| 6,278,197 B1 * | 8/2001 | Appa | ............................... | 290/55 |
| 6,285,090 B1 * | 9/2001 | Brutsaert et al. | ................ | 290/55 |
| 6,676,122 B1 * | 1/2004 | Wobben | ........................... | 290/55 |
| 6,988,574 B2 * | 1/2006 | Jones | ........................... | 180/68.1 |
| 7,435,057 B2 * | 10/2008 | Parera | ...................... | 416/231 R |
| 2006/0120862 A1 | 6/2006 | Jannasch et al. | | |
| 2007/0116567 A1 * | 5/2007 | Luetze | ........................ | 416/97 R |

* cited by examiner

*Primary Examiner* — Edward Look
*Assistant Examiner* — Sean J Younger
(74) *Attorney, Agent, or Firm* — Global Patent Operation; Douglas D. Zhang

(57) ABSTRACT

A ventilation arrangement for a wind turbine includes an air inlet opening located in a nose cone of said wind turbine, a manhole cover for covering a manhole of a rotor hub of said wind turbine, the manhole cover providing a vent opening for venting hot air from an internal space of said rotor hub, and a flexible piping establishing fluid communication between the internal space of the rotor hub and the air inlet opening.

15 Claims, 8 Drawing Sheets

VENTILATION ARRANGEMENT

BACKGROUND OF THE INVENTION

The present invention relates to a ventilation arrangement for a wind turbine rotor hub, and a manhole cover which may be applied in such ventilation arrangement.

Many installations inside the hub of a wind turbine rotor produce heat during operation. In particular, heat sources inside the hub are as diverse as relays installed in switch cabinets, batteries, chargers for batteries, pitch drive motors, pitch gear boxes, and pitch drive controllers, hydraulic units, as well as the main shaft bearing in some designs. However, reliable operation of several components is only guaranteed within a certain temperature range. For example, electronic circuits or batteries may malfunction at excess temperatures. Due to the several heat sources inside the hub, overheating problems of these components may occur, especially during summer.

To solve these overheating problems, ventilation holes are provided in the hub of some wind turbine designs. However, these ventilation holes are relatively small since, otherwise, water may leak into the interior of the hub through the ventilation holes. Of course, this is unfavorable in view of the sensitive electrical and mechanical installations in the hub. Therefore, only a small amount of heat can be exchanged through the small ventilation holes but the cross-sectional area of the ventilation holes cannot be simply enlarged.

BRIEF DESCRIPTION OF THE INVENTION

In view of the above, a manhole cover for a wind turbine rotor hub is provided, the manhole cover including a first section adapted for directing cool air into an internal space of the rotor hub and a second section adapted for venting hot air from said internal space.

Further aspects, advantages and features of the present invention are apparent from the dependent claims, the description and the accompanying drawings.

According to an embodiment of the invention, a ventilation arrangement for a wind turbine is provided. The ventilation arrangement includes an air inlet opening located in a nose cone of the wind turbine, and a manhole cover for covering a manhole of a rotor hub of the wind turbine. The manhole cover provides a vent opening for venting hot air from an internal space of said rotor hub. A flexible piping establishes fluid communication between the internal space of the rotor hub and the air inlet opening.

According to another embodiment of the invention, a ventilation arrangement for a wind turbine includes a manhole cover for covering a manhole of a rotor hub of said wind turbine, wherein the manhole cover provides an inlet opening for drawing cool air into an internal space of said rotor hub. Furthermore, a vent opening establishing fluid communication to an interior space of a rotor blade of the wind turbine is provided. Thus, hot air can be vented from the interior space of the rotor hub into the rotor blade and exhausted out of the blade at a defined exit.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Figure 1:
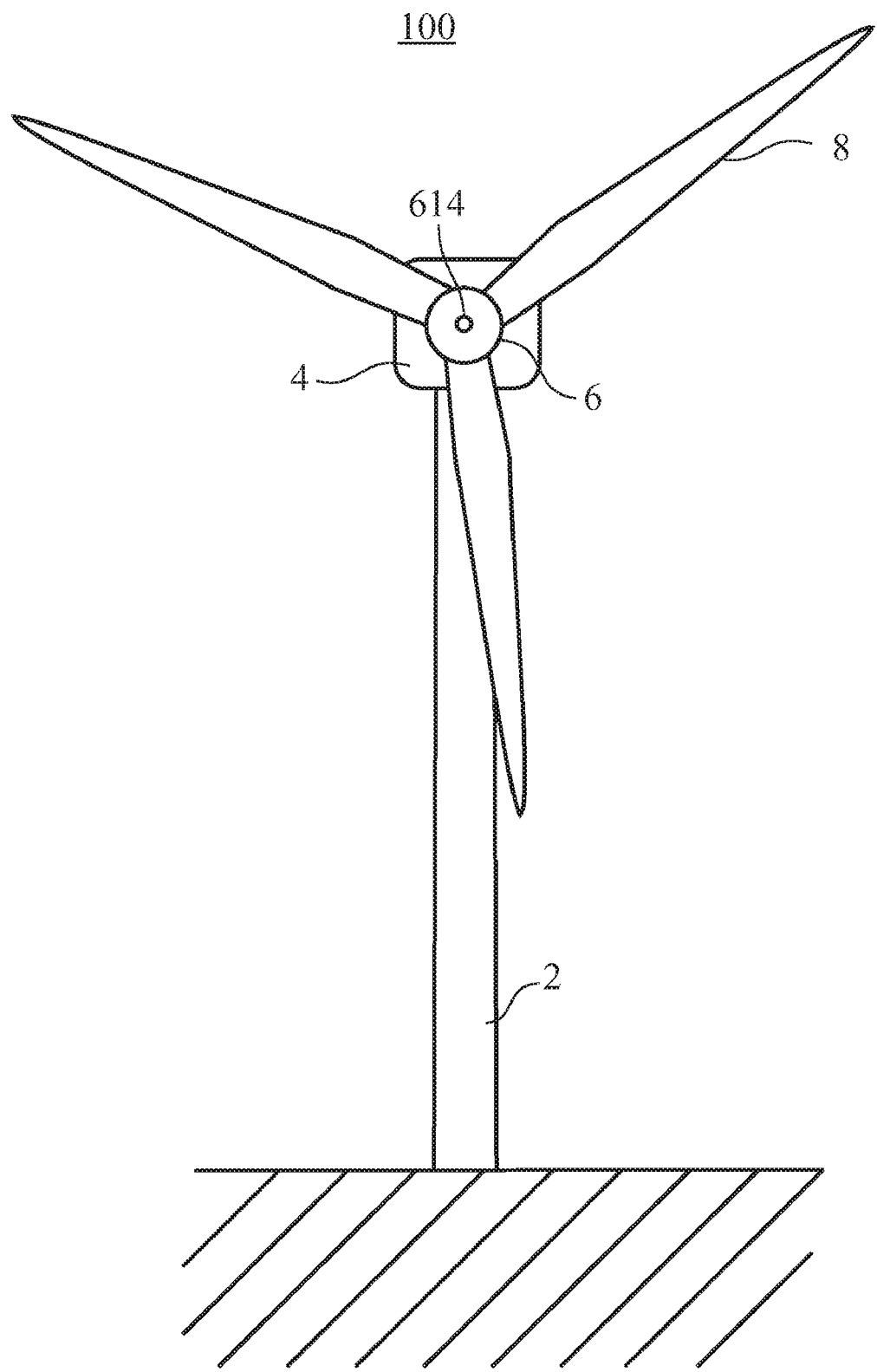
FIG. 1 shows a front view of a wind turbine according to an embodiment of the present invention.

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations. Furthermore, like reference numerals designate like features in the embodiments.

FIG. 1 shows a front view of a wind turbine 100 according to an embodiment of the present invention. The wind turbine includes a tower 2 which has a machine nacelle 4 mounted to its top end. A rotor hub portion 6 is attached to one end of nacelle 4 so that it can rotate about an axis essentially parallel to the ground. In the embodiment shown, three rotor blades 8 are attached to rotor hub portion 6. However, any other suitable number of rotor blades 8 may be used. In the center of rotor hub portion 6, an air inlet opening 614 is shown.

Figure 2:
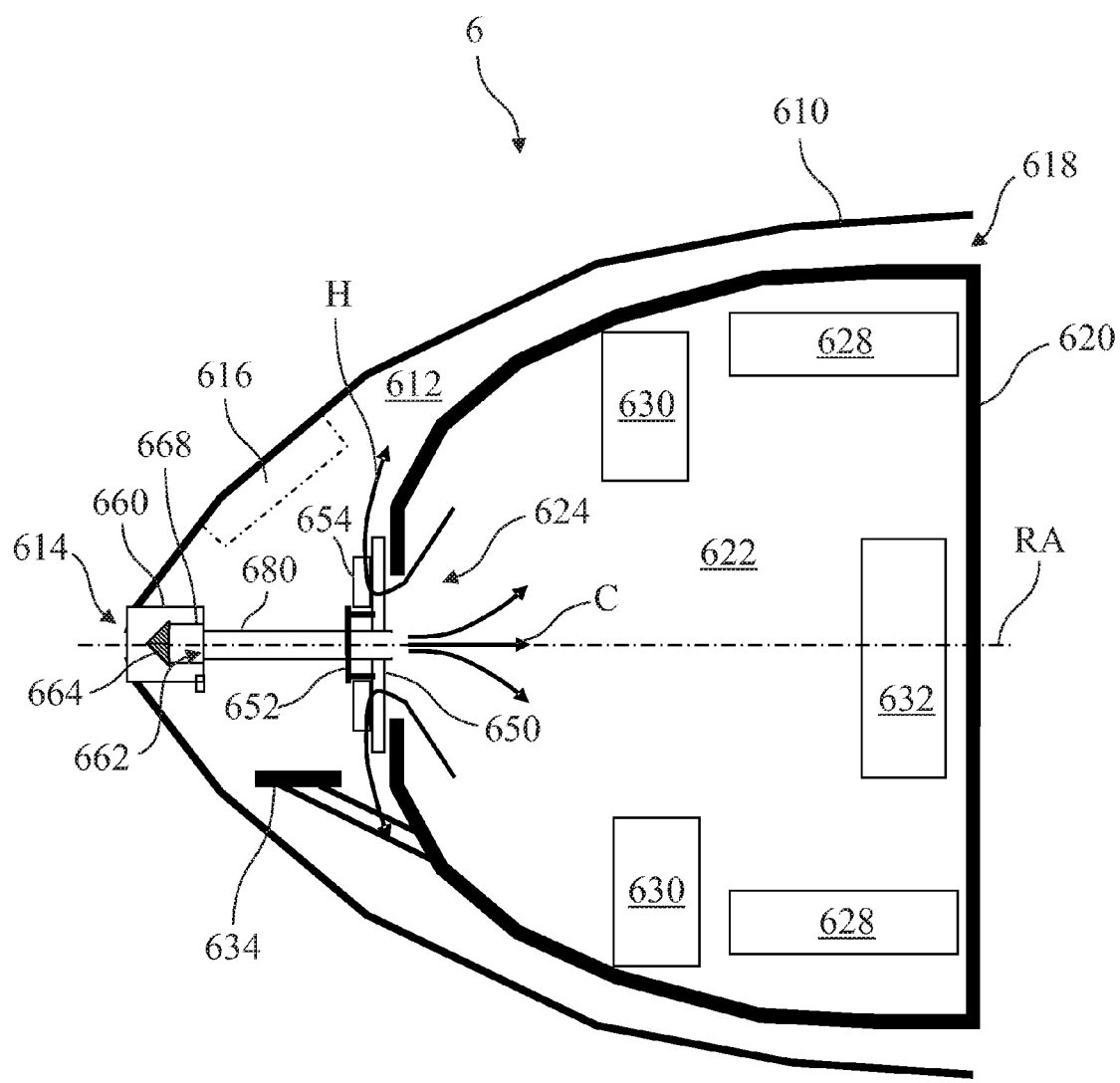
FIG. 2 shows a cross-sectional side view of a wind turbine rotor hub according to an embodiment of the present invention.

FIG. 2 shows a cross-sectional side view of a wind turbine rotor hub according to an embodiment of the present invention. Therein, a rotor hub 620 is contained within a nose cone 610. Typically, rotor hub 620 is made from cast steel or a similar material providing sufficient structural integrity. Typically, the rotor blades 8 (not shown) are attached to rotor hub 620 by means of flanges (not shown) and bolt connections. Nose cone 610 is typically made of a fiber-reinforced material, e.g. a glass-fiber reinforced plastic. Nose cone 610 provides a suitable aerodynamic design and, in addition, protects the rotor hub 620 from environmental influences like rain, snow, hail or the like. Nose cone 610 is spaced from rotor hub 620, thus providing an internal space 612 between the nose cone and the rotor hub. This internal space 612 may be entered through a hatch door 616 from the outside of nose cone 610. Furthermore, the internal space 612 extends to a rear end 618 of the nose cone 610 and the rotor hub 620. The rear end 618 is oriented toward the machine nacelle (not shown) but spaced from the nacelle wall. Thus, a pocket of air is formed between nacelle 4 and the rotor hub 620/nose cone 610. Typically, nose cone 610 and rotor hub 620 are symmetric with respect to the axis of rotation RA.

Inside rotor hub 620, an internal space 622 is provided. A number of installations 628, 630, 632 is disposed within said internal space. For example, for each of the rotor blades 8, axis cabinets 628 and pitch motors 630 may be provided. Furthermore, a central control cabinet 632 is typically also installed within rotor hub 620. Of course, further installations like batteries, chargers for batteries, pitch gear boxes, and hydraulic units may be provided within internal space 622. All these installations produce heat during operation so that the air within internal space 622 is heated.

Figure 3:
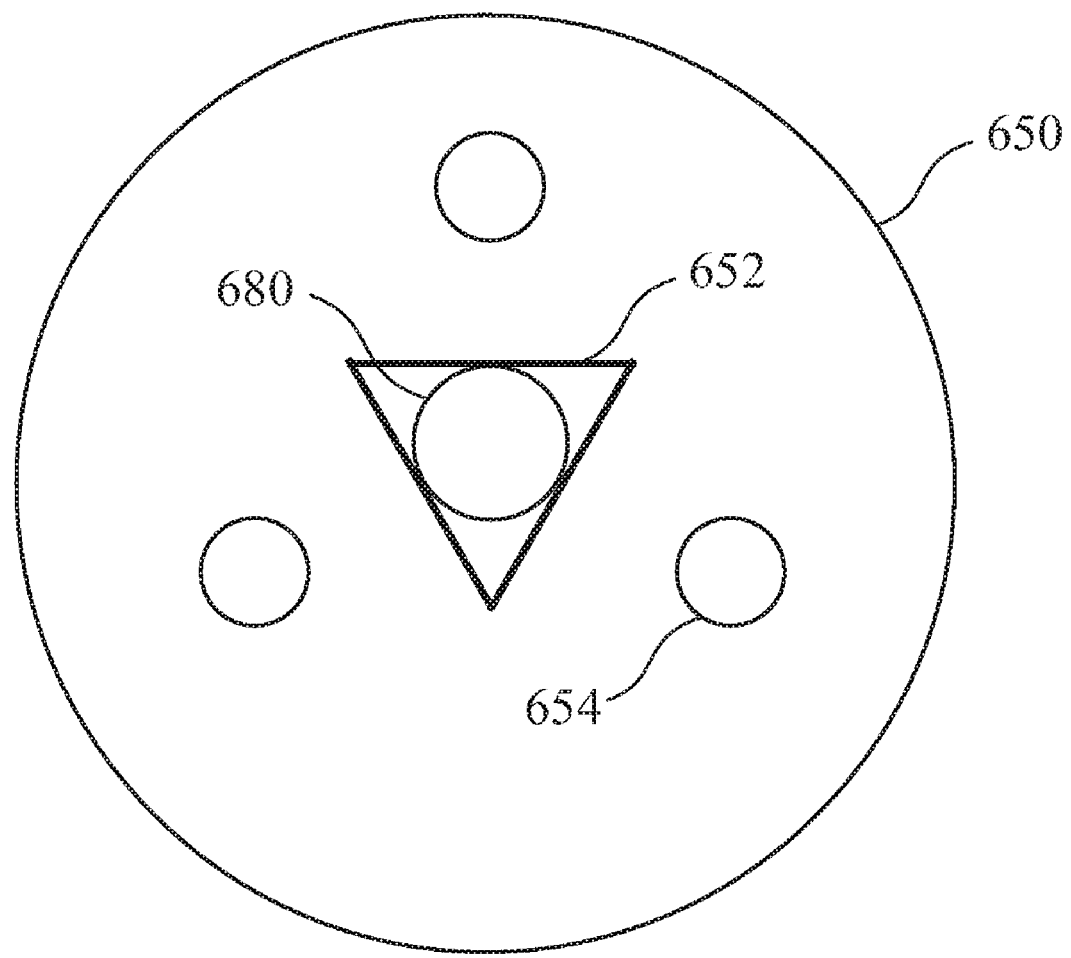
FIG. 3 shows a front view of a man hole cover according to an embodiment of the present invention.

Furthermore, a manhole 624 is provided in a front wall of rotor hub 620. Manhole 624 provides a passage between the internal space 622 of rotor hub 620 and the internal space 612 between nose cone 610 and rotor hub 620. A ledge step 634 is provided in front of manhole 624 to allow maintenance personnel to access the hub enclosure space 612. As with a number of installations, not only one but three ledge steps 634 are typically provided and arranged in a rotationally symmetric manner around rotational axis RA. Vent openings 654 are provided within manhole cover 650. The vent openings 654 are designed to allow hot air H to be vented from interior space 622 into the hub enclosure space 612. Typically, the vent openings 654 are provided with shielding members, e.g. rain gutters and/or shutters, to preventingress of water from hub enclosure space 612 into the interior space 622 of rotor hub 620. Of course, ingress of water into internal space 622 may be hazardous in view of the electric and electronic installations inside rotor hub 620. Furthermore, at offshore sites the water may contain a considerable amount of salt, thus promoting corrosion inside rotor hub 620. Furthermore, manhole cover 650 is provided with a tristep 652 mounted to a front surface of manhole cover 650. Typically, tristep 652 is a triangular structure formed from steel bars and spaced from the manhole cover 650 by brackets. The structure of the tristep 652 can also be seen in FIG. 3 showing a front view of the manhole cover 650.

Furthermore, an air inlet 614 is provided at the tip end of nose cone 610 (see also FIG. 1). Air inlet opening 614 is formed in a stiff piping 660 extending inwardly into hub enclosure space 612. Stiff piping 660 has a further smaller opening 662 at its rear end. A flexible piping 680 is fixed to the rear end of stiff piping 660 and extends through an opening within manhole cover 650 into internal space 622 of rotor hub 620. Thus, fluid communication between internal space 622 of rotor hub 620 and the ambient atmosphere outside nose cone 610 is established. Accordingly, cool air C can be drawn from the ambient atmosphere and directed into internal space 622 for cooling the installations 628, 630, 632. Typically, flexible piping 680 is held by manhole cover 650 in a manner which allows relative movement between piping 680 and manhole cover 650. In particular, the flexible piping 680 may be supported by the manhole cover so that the manhole cover and the flexible piping can rotate with respect to each other. For example, the dimensions of tristep 652 may be adapted to the diameter of flexible piping 680. Thus, the flexible piping 680 is simply held by tristep 652 and within the opening of manhole cover 650. Furthermore, a shielding member 664 is provided within stiff piping 660. Shielding member 660 serves to prevent ingress of water into flexible piping 680. In the embodiment shown in FIG. 2, shielding member 664 includes a cone deflector 664 which is held in a spaced relation from rear end opening 662 by means of brackets 668. Of course also other shielding members suitable for preventing or reducing the ingress of water into flexible piping 680 may be applied.

During operation of the wind turbine, the front end of nose cone 610 faces the wind direction. Therefore, cool air from the ambient atmosphere is forced into air inlet opening 614. The cool air flows around cone deflector 664 and through rear end opening 662 into flexible piping 680. Flexible piping 680 directs the cool air C into the internal space 622 of rotor hub 620 so that installations 628, 630, 632 can be cooled by cool air C. At the same time, hot air H is vented from the interior 622 of the rotor hub through vent openings 654 into the hub enclosure space 612. During operation of the wind turbine, a natural low pressure pocket forms in the space between the rear end 618 of the rotor hub and the nacelle. Therefore, the hot air H vented from the interior 622 of the hub rotor is drawn toward the rear end 618 of the hub enclosure space 612 and exhausted into the atmosphere. Thus, the above-described embodiment provides a simple and effective ventilation of the interior space 622 of the rotor hub.

Figure 4:
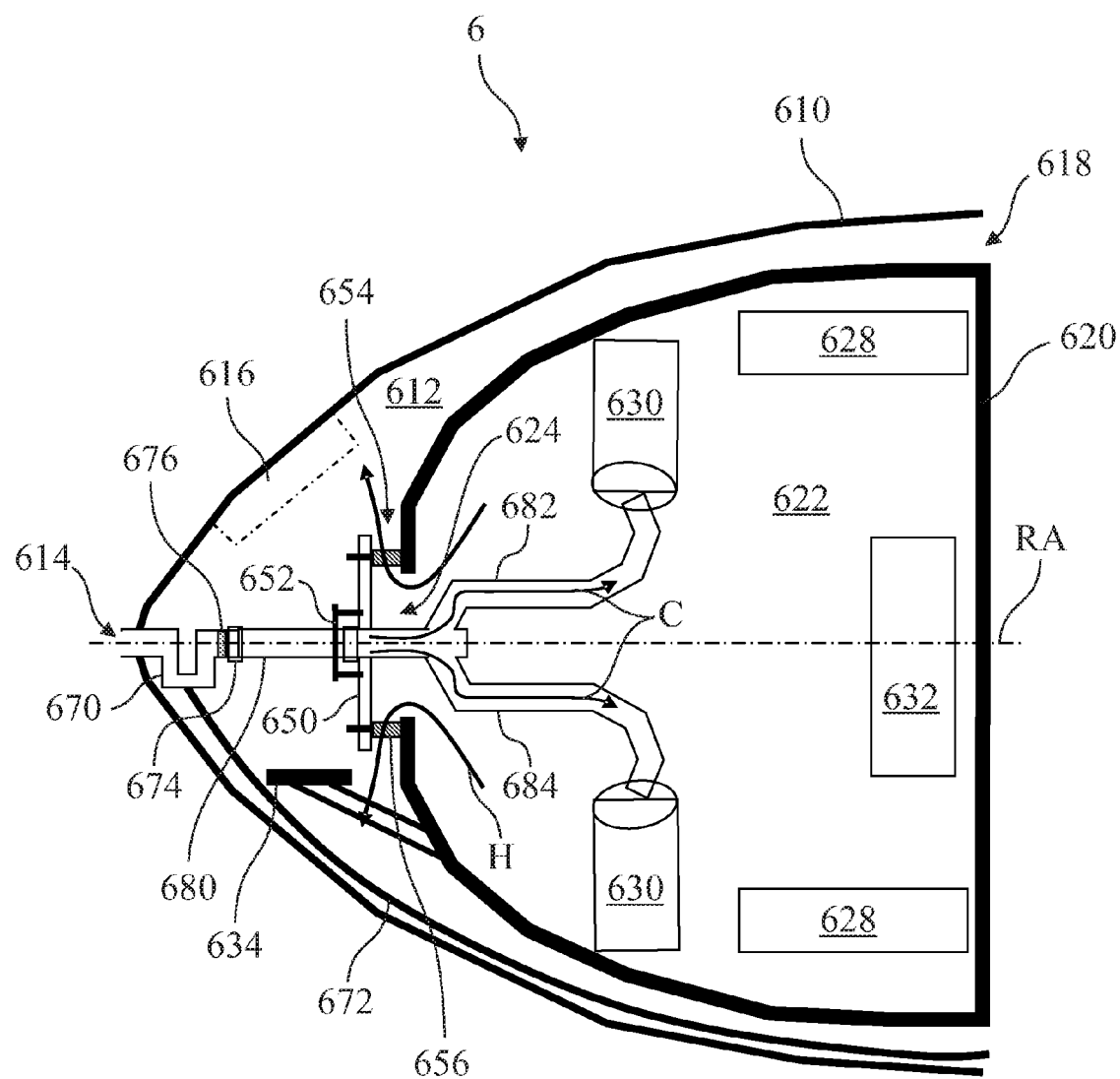
FIG. 4 shows a cross-sectional side view of a wind turbine rotor hub according to another embodiment of the present invention.

FIG. 4 shows a cross-sectional side view of a wind turbine rotor hub according to another embodiment of the present invention. In this embodiment, spacers 656 are provided to hold the manhole cover 650 in a spaced relation from the front wall of rotor hub 620. Thus, vent openings 654 are provided between the manhole cover 650 and the rotor hub wall. Hot air H can be vented from the interior space 622 of rotor hub 620 into the hub enclosure space 612 and exhausted toward the rear end 618 as described above. Instead of cone deflector 664, the embodiment shown in FIG. 4 utilizes an elbow 670 to collect rain water entering through air inlet opening 614. A drain line 672 is connected to a bottom of elbow 670 and extends toward the rear end 618 of the rotor hub. Thus, water collected by elbow 670 can be discharged therefrom through drain line 672. Furthermore, an air filter 676 is mounted between elbow 670 and flexible piping 680 to prevent ingress of liquid and/or dust into the hub interior 622. For example, air filter 676 may be as fine as 1 micron so that the cool air C is sufficiently filtered before entering the hub interior. Elbow 670 and/or air filter 676 are connected to flexible piping 680 via a coupling 674.

Furthermore, the ventilation arrangement shown in FIG. 4 includes a branched piping system. Each branch 682, 684 of the piping system extends from the manhole cover 650 toward a respective pitch motor 630. The flexible branches 682, 684 are coupled to the pitch motors 630 by means of a motor coupler (not shown). Each of the pitch motors is equipped with a centrifugal fan (not shown) which creates a suction force drawing cool air into the branched piping system. Thus, the cool air C is specifically directed toward the pitch motors which may be considered a predominant heat source within rotor hub 620. As a result, an effective cooling of the pitch motors is provided since the cool air is directly supplied to the pitch motors and not distributed within the interior space 622. Although only two pitch motors 630 and only two branches 682, 684 are shown in FIG. 4, it will be understood by those skilled in the art that also a third branch leading toward a third pitch motor will be provided in the embodiment.

Figure 5:
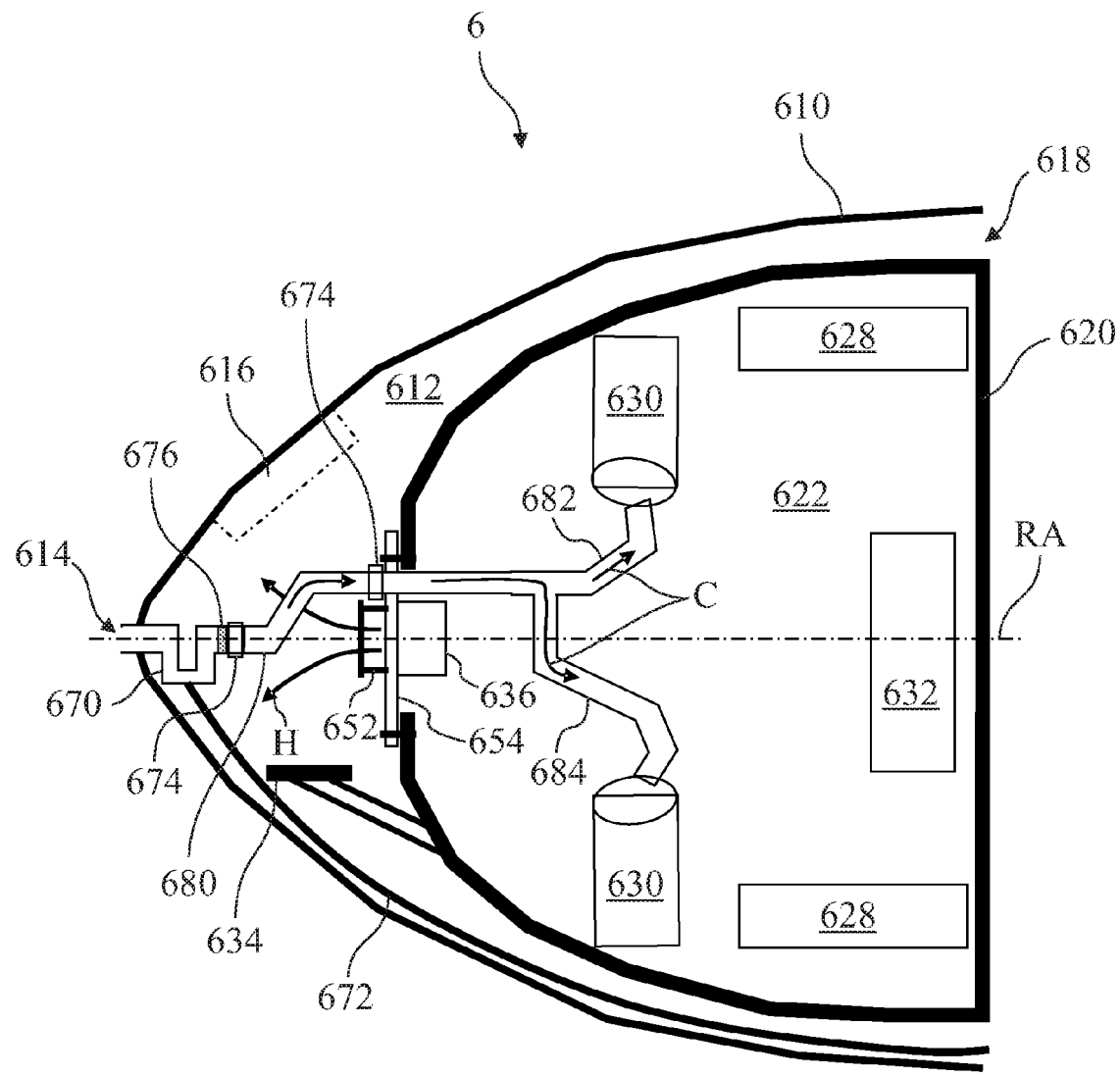
FIG. 5 shows a cross-sectional side view of a wind turbine rotor hub according to a further embodiment of the present invention.

FIG. 5 shows a cross-sectional side view of a wind turbine rotor hub according to a further embodiment of the present invention. The embodiment shown in FIG. 5 is similar to the embodiment shown in FIG. 4 but the flexible piping 680 is led through the manhole cover 650 at an off-center position. Instead of spacers providing a vent opening, a fan 636 is mounted in front of a central opening of manhole cover 650. Fan 636 is adapted to actively exhaust hot air H from the hub interior 622. Due to the active venting of the internal space 622, the ventilation efficiency of the system is considerably increased.

Figure 6:
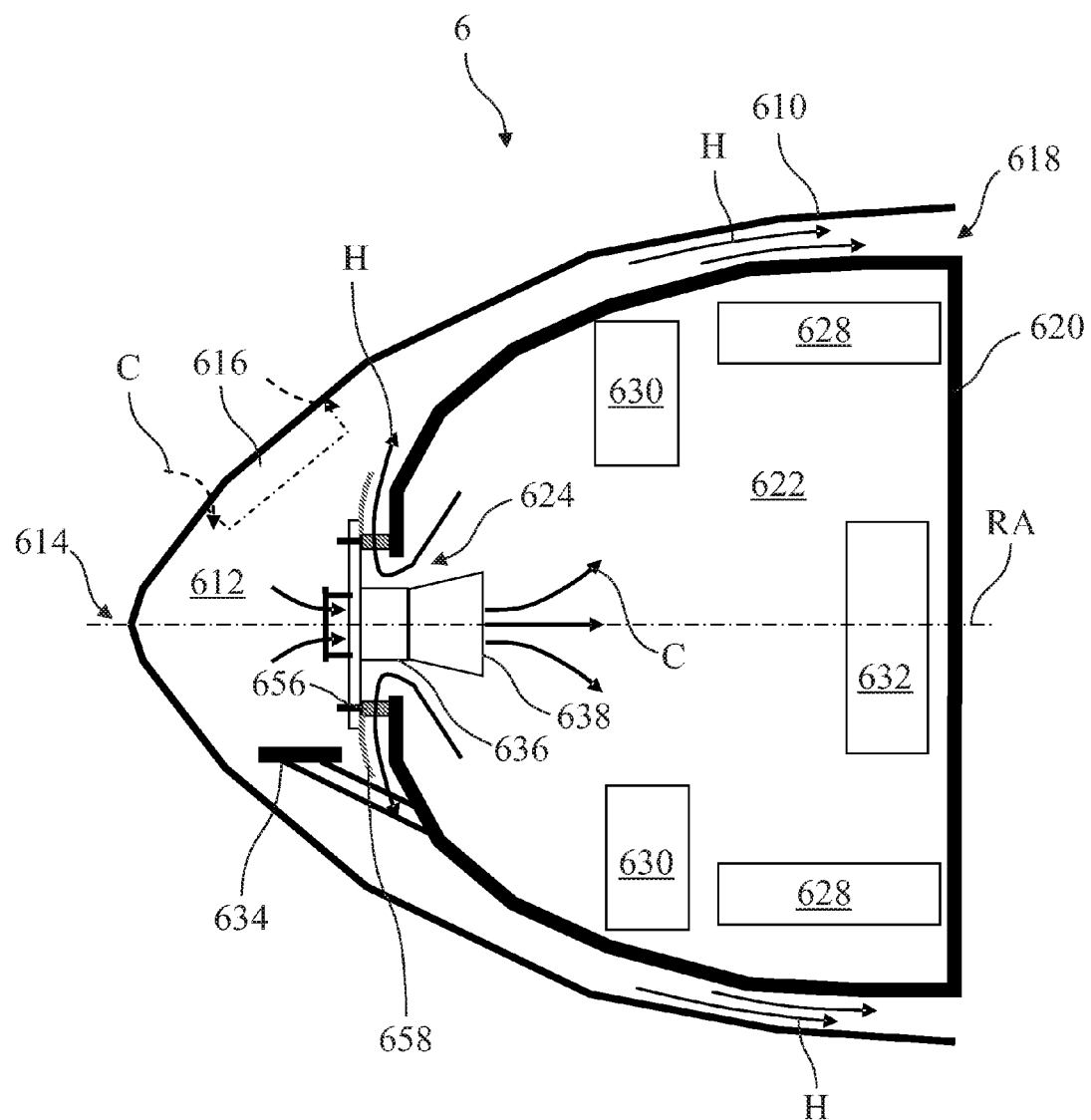
FIG. 6 shows a cross-sectional side view of a wind turbine rotor hub according to a different embodiment of the present invention.

FIG. 6 shows a cross-sectional side view of a wind turbine rotor hub according to a different embodiment of the present invention. In contrast to the embodiment shown in FIG. 5, the fan 636 mounted to manhole cover 650 is adapted to draw cool air from the hub enclosure space 612 into the hub interior 622. A diverging nozzle 638 is mounted downstream of fan 636 and adapted to distribute the cool air C effectively within the interior space 622. Hot air H is vented from the interior space 622 through vent openings provided by spacers 656 between the front wall of rotor hub 620 and manhole cover 650. Furthermore, a shroud 658 is provided at manhole cover 650 to direct the vented hot air H toward the rear end 618 of the rotor hub. In the embodiment shown in FIG. 6, no specific air inlet opening is provided in the nose cone 610. Instead, the hatch door 616 serves as an air inlet since the drawing action exerted by fan 636 is strong enough to draw a sufficient amount of cool air C from ambient atmosphere into the hub enclosure space 612. In an alternative embodiment (not shown), fan 636 may be connected to an air inlet opening 614 via a flexible piping 680. In particular, any of the above configurations of piping 680, elbow 670 and cone deflector 664 may be applied.

Figure 7:
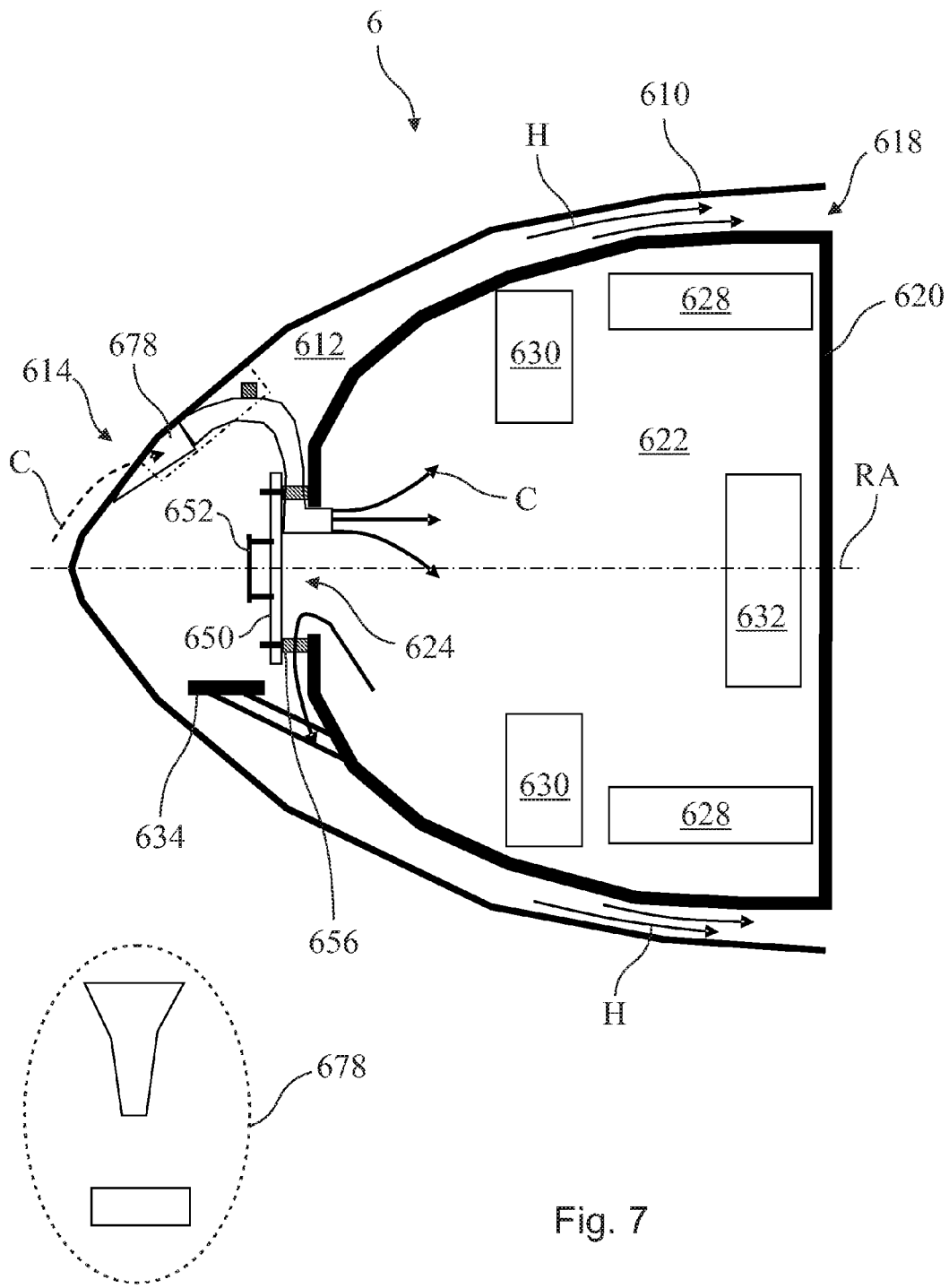
FIG. 7 shows a cross-sectional side view of a wind turbine rotor hub according to still another embodiment of the present invention.

FIG. 7 shows a cross-sectional side view of a wind turbine rotor hub according to still another embodiment of the present invention. In this embodiment, an air inlet opening 614 is provided at the front end side of nose cone 610. Behind the air inlet 614, a so-called NACA duct 678 is provided. The NACA duct has a specific profile which is shown in the encircled inset on the lower left of FIG. 7. According to its profile, the NACA duct scavenges air from the boundary layer and conducts it into the internal space 622 of rotor hub 620. However, no dynamic head is lost by applying this principle. The NACA duct profile is known per se in the art and will therefore not be described in more detail hereinafter. Hot air H is passively vented through the ventilation opening provided by spacers 656 as has been described above with respect to FIGS. 4 and 6. One or more NACA ducts could be applied in the configurations to passively or actively ventilate the hub.

Figure 8:
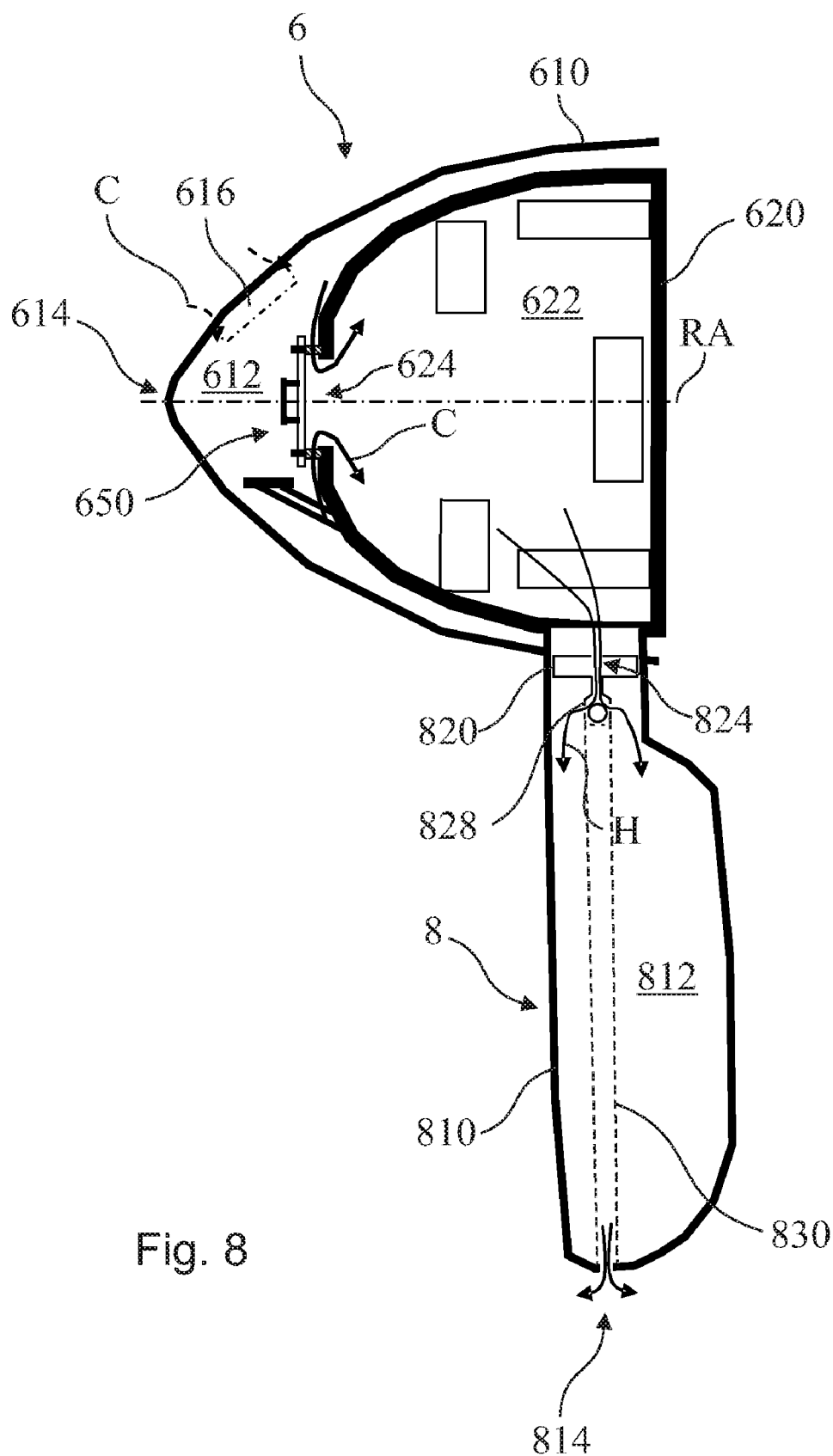
FIG. 8 shows a cross-sectional side view of a wind turbine rotor hub and a rotor blade according to still a further embodiment of the present invention.

FIG. 8 shows a cross-sectional side view of a wind turbine rotor hub and a rotor blade according to still a further embodiment of the present invention. In this embodiment, cool air C is drawn into the interior space 622 of rotor hub 620 through openings provided by spacers between the manhole cover 650 and the front end wall of the rotor hub 620. However, other than in the above-described embodiments the hot air inside rotor hub 620 is not vented into the hub enclosure space 612. Instead, the hot air is vented into an internal space 812 of a rotor blade 8 attached to the rotor hub 620. For this purpose, a vent hole 824 is provided in a blade closure 820 in the root section of rotor blade 8. The vent hole 824 establishes fluid communication between the interior space 622 of rotor hub 620 and interior space 812 of rotor blade 8. Furthermore, at least one exhaust hole 814 is provided in a surface 810 of rotor blade 8. Of course, also more than one exhaust holes may be provided. In a typical embodiment, the exhaust hole is located at or at least adjacent to a tip end of the rotor blade. Additionally or alternatively, one or more exhaust holes may be provided at a trailing end of rotor blade 8 and/or at the suction side of the blade. The exhaust hole 814 establishes fluid communication between the interior space 812 of blade 8 and the ambient atmosphere. Furthermore, a check valve 828 or a similar means is provided at vent hole 824 to prevent water and/or debris from entering the interior space 622 of the rotor hub.

During operation of the wind turbine, centrifugal force is acting onto the air inside rotor blade 8. Thus, a low pressure zone is formed at the blade root and a high pressure zone is formed at the tip end of the blade. Accordingly, hot air H is drawn into the interior 812 of blade 8 from the interior space 622 of rotor hub 620. Furthermore, a suction force inside rotor blade 8 is established as air is exhausted from the blade tip due to centrifugal pumping. In particular, the exhaust hole 814 may move at a tip speed up to 200 m/s.

According to a further embodiment, a piping 830, e.g. a plastic hose, may be provided inside the blade 8. Piping 830 connects vent hole 824 directly with exhaust hole 814.

In the present embodiment, the cool air is drawn in through the hatch door and openings provided by spacers. However, it will be understood by those skilled in the art that any of the above-described arrangements for drawing-in cool air may also be combined with the hot air ventilation through the rotor blade. In particular, cool air may be drawn in by a passive system as shown in FIG. 2 or 7, or an active system as shown in any of FIGS. 4 to 6.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A ventilation arrangement for a wind turbine, comprising:
    an air inlet opening located in a nose cone of said wind turbine;
    a manhole cover for covering a manhole of a rotor hub of said wind turbine, wherein the rotor hub is contained within the nose cone and spaced therefrom to form an internal space between an inner surface of the nose cone and an outer surface of the rotor hub, the manhole cover providing a vent opening for venting hot air from an internal space of said rotor hub into the internal space between the inner surface of the nose cone and the outer surface of the rotor hub; and
    a piping establishing fluid communication between the internal space of the rotor hub and the air inlet opening.

2. The ventilation arrangement according to claim 1, wherein the piping comprises a flexible piping which is supported by the manhole cover so that the manhole cover and the flexible piping can rotate with respect to each other.

3. The ventilation arrangement according to claim 1, further comprising a shielding member located adjacent the air inlet opening, wherein the shielding member is configured to preventingress of water into the piping.

4. The ventilation arrangement according to claim 1, further comprising an air filter disposed between the air inlet opening and the internal space of the rotor hub for filtering the cool air directed into the internal space of the rotor hub.

5. The ventilation arrangement according to claim 1, wherein the vent opening is provided with shutters to preventingress of water into the internal space of the rotor hub.

6. The ventilation arrangement according to claim 1, further comprising spacers configured to provide a space between the manhole cover and a wall of the rotor hub so that hot air can be vented from the inside of the rotor hub through said space.

7. The ventilation arrangement according to claim 1, further comprising a branched piping located inside the rotor hub, wherein each branch of the piping leads from the piping toward an installation to be cooled.

8. The ventilation arrangement according to claim 1, further comprising a fan mounted in front of an opening of the manhole cover, the fan being configured to exhaust hot air from the internal space of the rotor hub into the internal space between the inner surface of the nose cone and the outer surface of the rotor hub.

9. The ventilation arrangement according to claim 1, further comprising a fan mounted in front of an opening of the manhole cover, the fan being configured to draw cool air from an exterior space of the rotor hub.

10. The ventilation arrangement according to claim 9, further comprising a diverging nozzle disposed behind the fan to distribute cool air within said internal space of the rotor hub.

11. The ventilation arrangement according to claim 1, further comprising a duct located behind the air inlet opening, the duct having a NACA profile to draw cool air from outside the nose cone, wherein the duct is connected to the piping.

12. The ventilation arrangement according to claim 1, wherein the manhole cover is disposed in the internal space between the nose cone and the rotor hub.

13. The ventilation arrangement according to claim 12, wherein the piping comprises a flexible piping and an elbow located inside of the nose cone and upstream of the flexible piping to preventingress of water into the flexible piping.

14. The ventilation arrangement according to claim 13, further comprising a drain piping extending between the elbow and a rear end of the rotor hub facing a nacelle of the wind turbine.

15. The ventilation arrangement according to claim 12, wherein the piping comprises a flexible piping which is supported by the manhole cover so that the manhole cover and the flexible piping can rotate with respect to each other.

\* \* \* \* \*

UNITED STATES PATENT AND TRADEMARK OFFICE
CERTIFICATE OF CORRECTION

PATENT NO. : 8,186,940 B2  
APPLICATION NO. : 11/850104  
DATED : May 29, 2012  
INVENTOR(S) : Bernard P. Landa et al.

Page 1 of 1

It is certified that error appears in the above-identified patent and that said Letters Patent is hereby corrected as shown below:

On the Title Page, in Field (75), under "Inventors", in Column 1, Line 1, delete "Taylore," and insert -- Taylors, --, therefor.

On the Title Page, in Field (75), under "Inventors", in Column 1, Line 7, delete "AZ" and insert -- CA --, therefor.

In Column 3, Line 24, delete "preventingress" and insert -- prevent ingress --, therefor.

In Column 6, Line 55, in Claim 3, delete "preventingress" and insert -- prevent ingress --, therefor.

In Column 6, Lines 61-62, in Claim 5, delete "preventingress" and insert -- prevent ingress --, therefor.

In Column 8, Line 9, in Claim 13, delete "preventingress" and insert -- prevent ingress --, therefor.

Signed and Sealed this  
Thirteenth Day of November, 2012

David J. Kappos  
*Director of the United States Patent and Trademark Office*